(12) United States Patent
Wong et al.

(10) Patent No.: US 10,802,224 B2
(45) Date of Patent: Oct. 13, 2020

(54) IN-LINE HINGED DUST SHUTTER ASSEMBLY FOR A FIBER OPTIC CONNECTOR

(71) Applicant: Senko Advanced Components Inc, Marlborough, MA (US)

(72) Inventors: Yim Wong, Kowloon (HK); Kazuyoshi Takano, Tokyo (JP)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 16/681,484

(22) Filed: Nov. 12, 2019

(65) Prior Publication Data

US 2020/0150353 A1 May 14, 2020

Related U.S. Application Data

(60) Provisional application No. 62/758,683, filed on Nov. 11, 2018.

(51) Int. Cl.
*G02B 6/38* (2006.01)
(52) U.S. Cl.
CPC ......... *G02B 6/3849* (2013.01); *G02B 6/3825* (2013.01); *G02B 6/3869* (2013.01); *G02B 6/3893* (2013.01)
(58) Field of Classification Search
CPC .. G02B 6/3849; G02B 6/3825; G02B 6/3869; G02B 6/3893; G02B 6/4296
USPC ........................................ 385/55, 58, 76–78
See application file for complete search history.

(56) References Cited

U.S. PATENT DOCUMENTS

| 9,581,767 | B2 * | 2/2017 | Leigh | G02B 6/3893 |
| 9,798,092 | B2 * | 10/2017 | Leigh | G02B 6/4296 |
| 2013/0071066 | A1 * | 3/2013 | Lu | G02B 6/3849 |
| | | | | 385/58 |
| 2013/0071068 | A1 | 3/2013 | Lin | |
| 2013/0121643 | A1 | 5/2013 | Sanders et al. | |
| 2016/0062051 | A1 | 3/2016 | Taira et al. | |
| 2016/0216456 | A1 | 7/2016 | Leigh et al. | |
| 2016/0349459 | A1 | 12/2016 | Collier et al. | |
| 2018/0292612 | A1 | 10/2018 | Chang et al. | |

FOREIGN PATENT DOCUMENTS

TW  M567872 U  *  6/2018  ........... G02B 6/3825

OTHER PUBLICATIONS

International Search Report and Written Opinion issued for PCT/US2019/060976 dated Feb. 26, 2020, 6 pages.*
International Search Report and Written Opinion; Application No. PCT/US2018/042202, dated Dec. 7, 2018, pp. 17.

* cited by examiner

*Primary Examiner* — Michael P Mooney
(74) *Attorney, Agent, or Firm* — Edward S. Jarmolowicz, Esq.

(57) ABSTRACT

An in-line dust shutter formed as part an adapter. A hinged dust shutter assembly is secured to an adapter wall. A shutter plate covers an opening formed at either end of the adapter to prevent debris from entering the adapter and distorting the light signal between opposing fiber optic connectors. The shutter plate extends at angle alpha from a rotational axis. The shutter plate is biased closed by a bias spring place about a pin of the rotational axis.

11 Claims, 19 Drawing Sheets

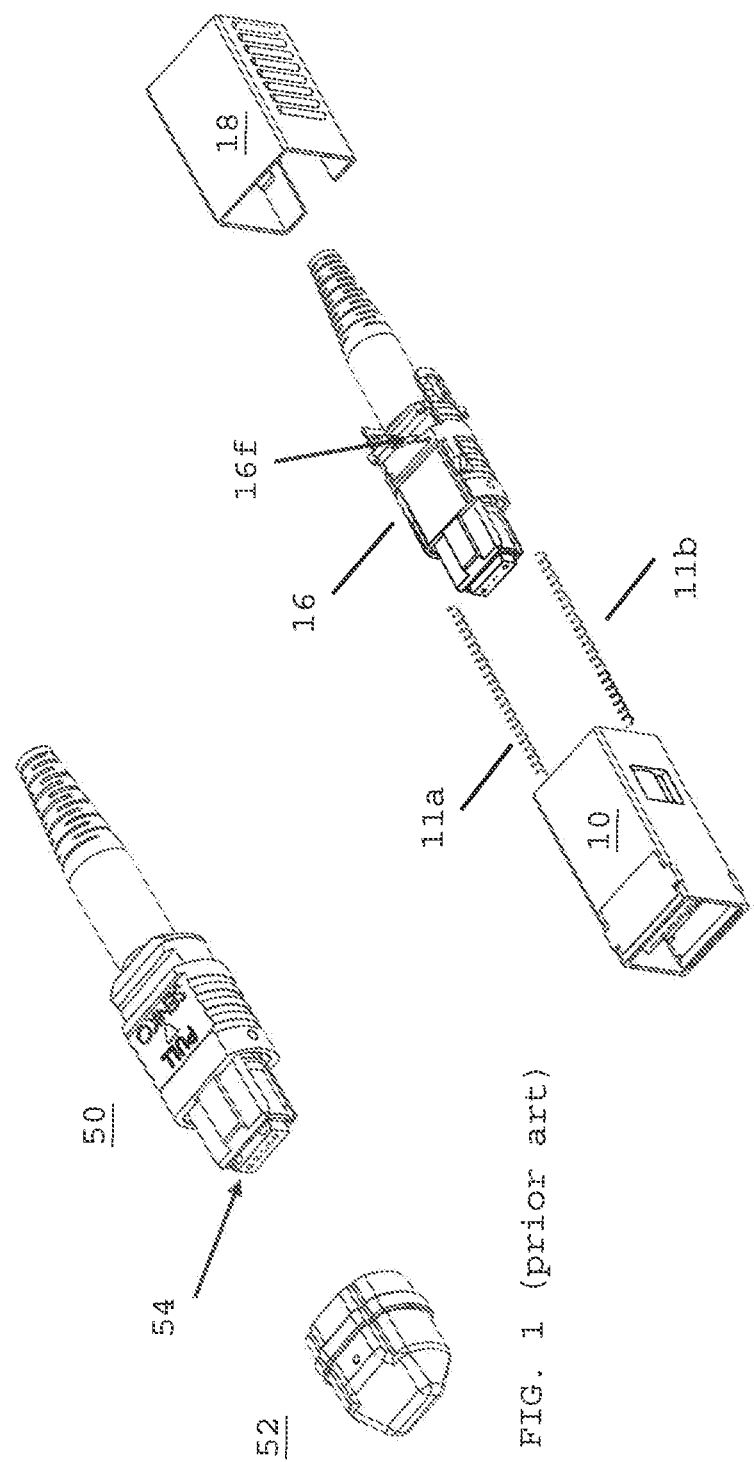

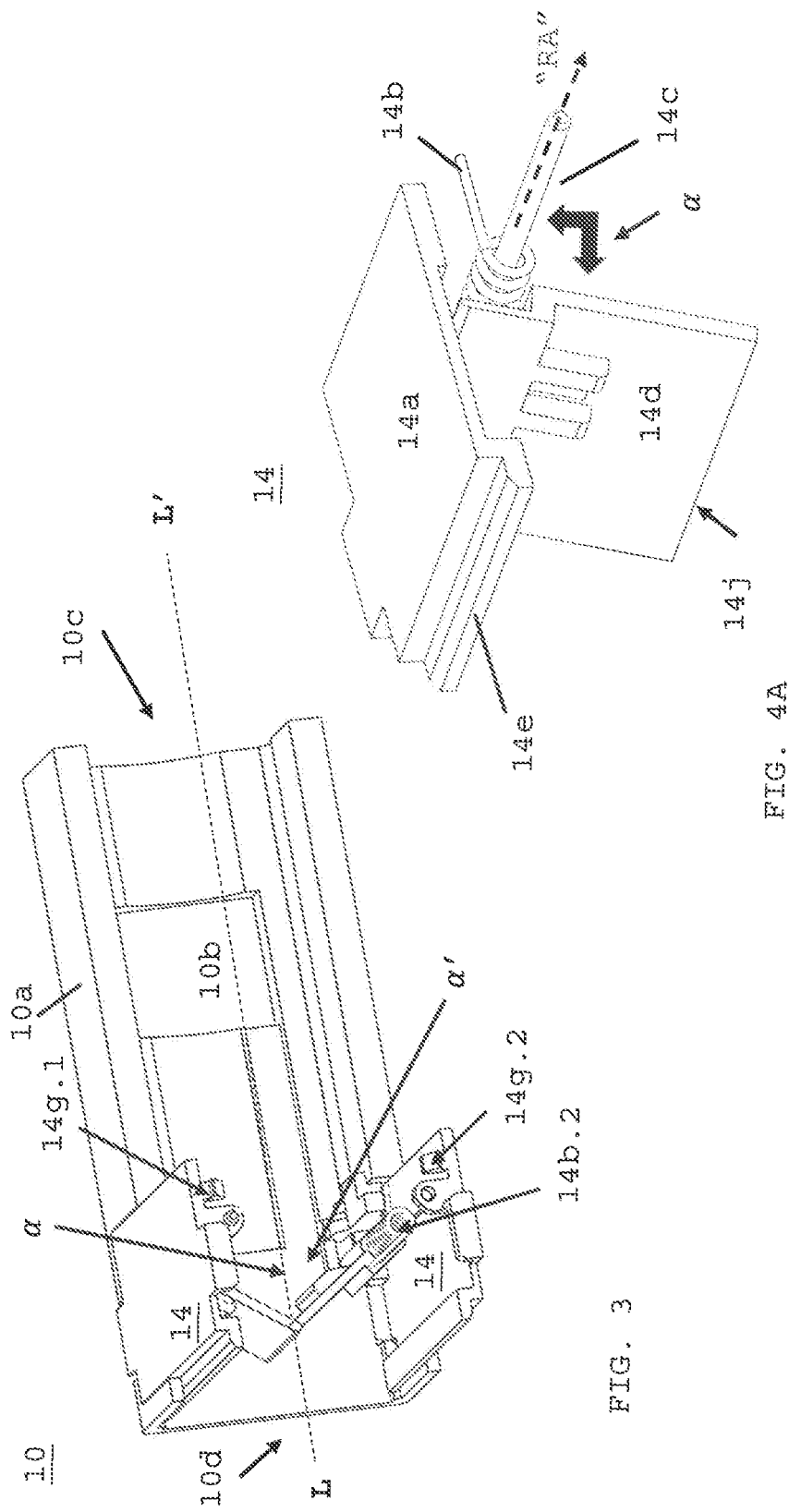

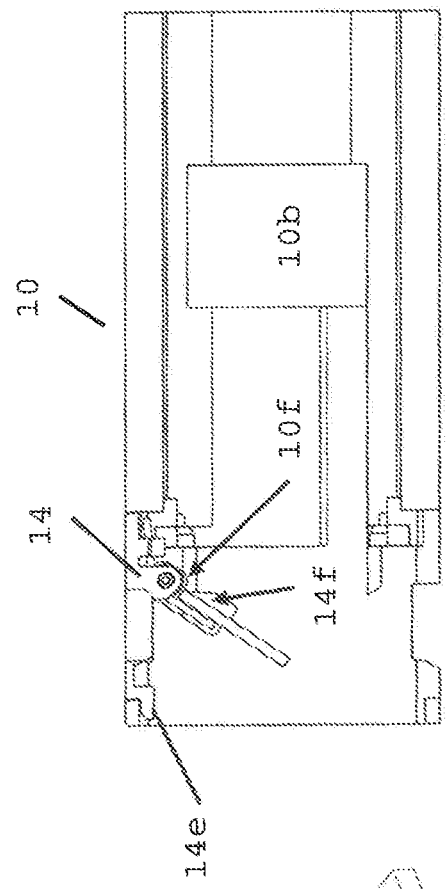
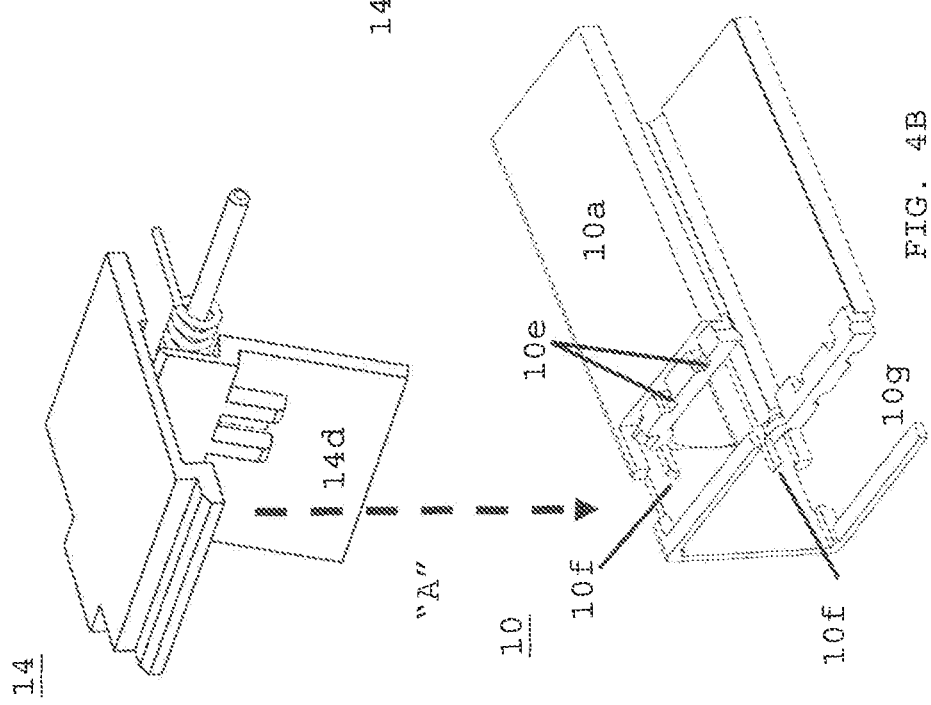

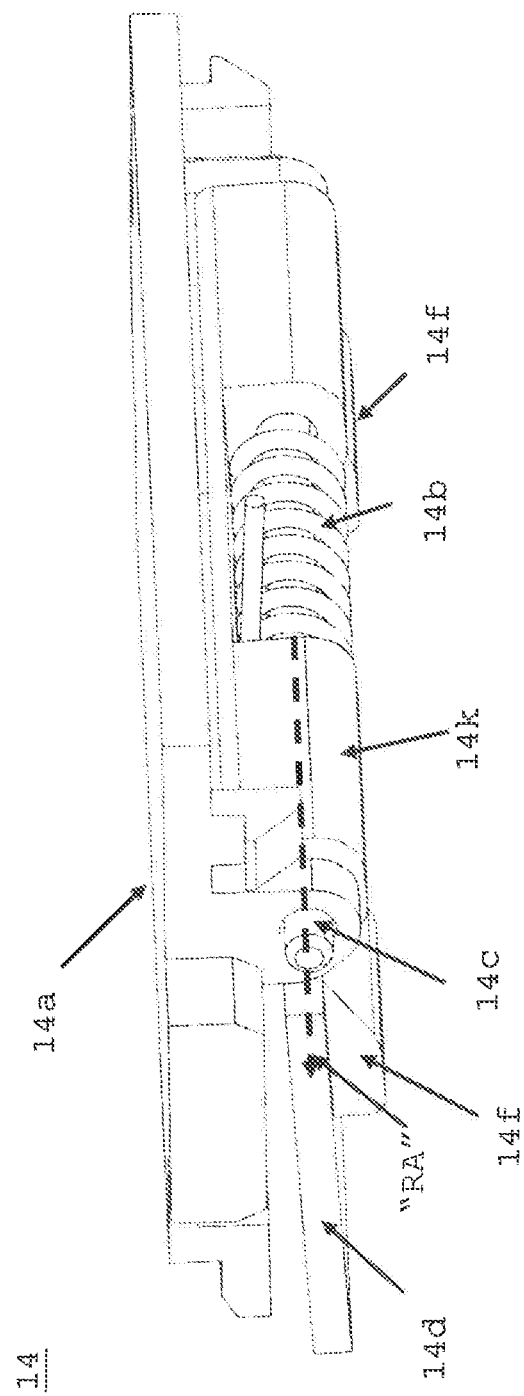

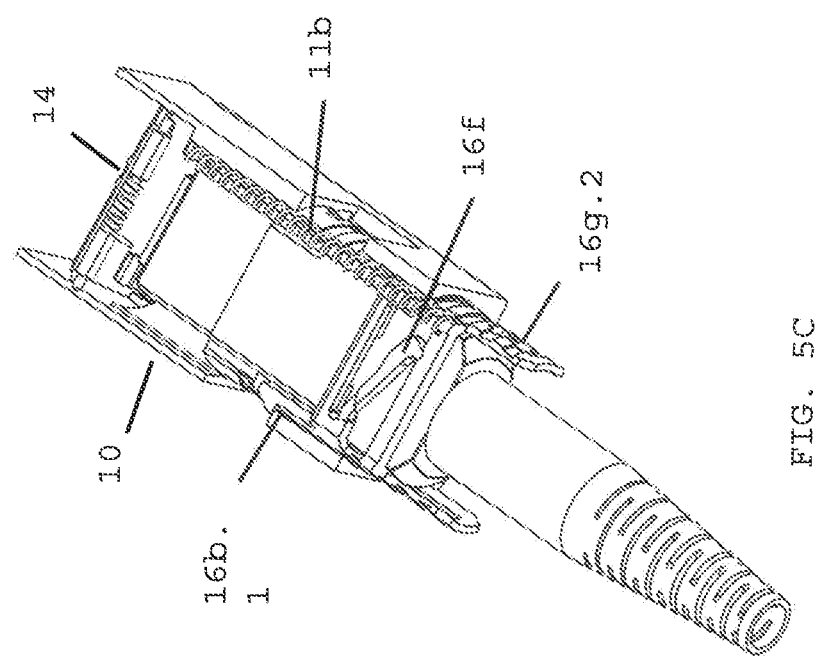
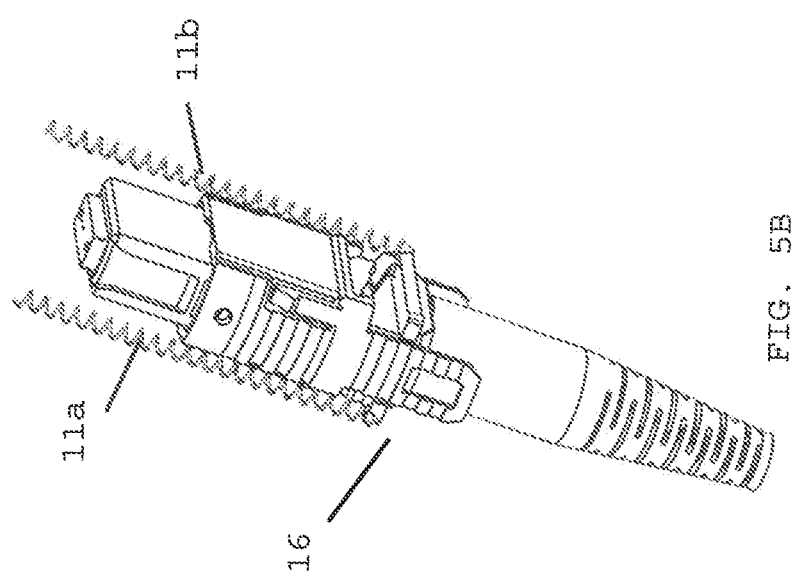

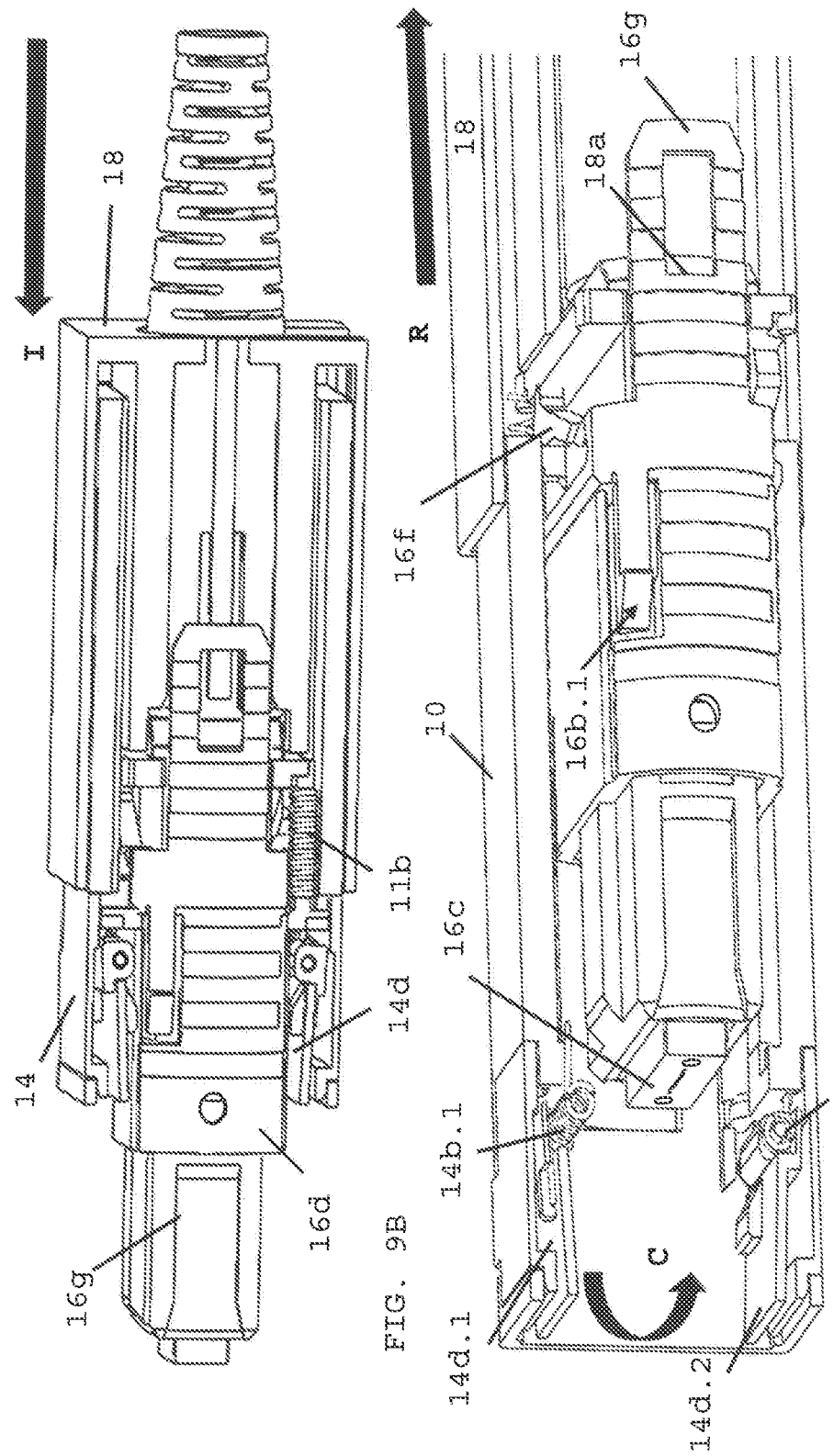

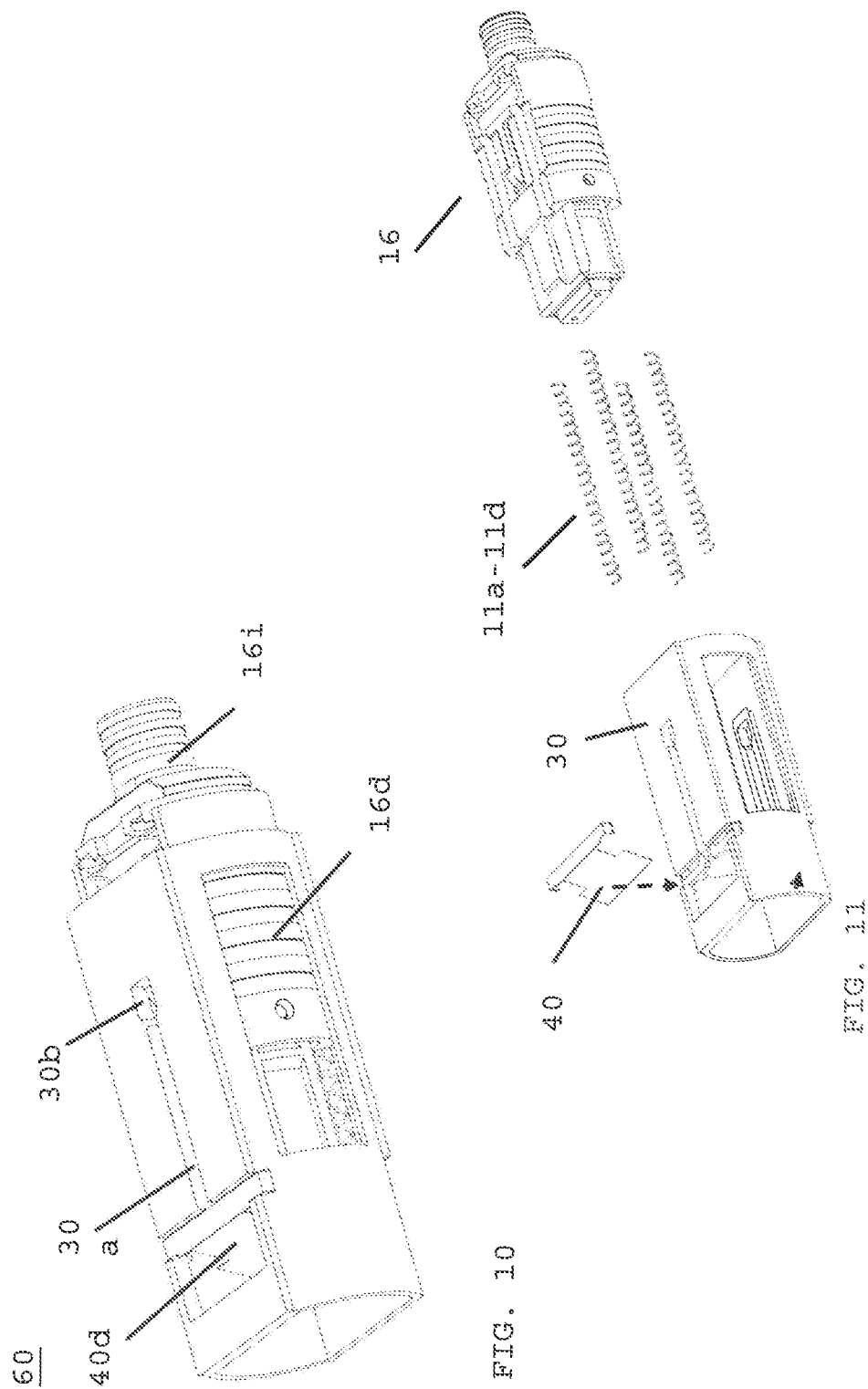

IN-LINE HINGED DUST SHUTTER ASSEMBLY FOR A FIBER OPTIC CONNECTOR

RELATED APPLICATIONS

This application claims priority to U.S. Patent Application 62/758,683 filed Nov. 11, 2018 and titled "In-Line Dust Shutter for a Fiber Optic Connector", which is fully incorporated by reference into the present application.

BACKGROUND

Demand for bandwidth by enterprises and individual consumers continues to experience exponential growth. To meet this demand efficiently and economically, data centers have to achieve ultra-high density cabling with low loss budgets. Fiber optics have become the standard cabling medium used by data centers to meet the growing needs for data volume and transmission speeds, Individual optical fibers are extremely small. For example, even with protective coatings, optical fibers may be only about 250 microns in diameter (only about 4 times the diameter of a human hair). As such, hundreds of fibers can be installed in cables that will take up relatively little space. For connections between cables, however, the fibers are terminated with connectors. Multiple fibers may be arranged within a single connector. For example, multi-fiber connectors such as those using multi-fiber push-on/pull-off (MPO) technology may contain and connect 12 or 24 fibers. Connectors, such as MPO type connectors, generally include a housing portion that contains a ferrule that terminates the ends of the fibers. Ferrules are generally used to retain the ends of the optical fibers for connecting the optical fibers. One type of optical ferrule that may be used with MPO type connectors is an MT (Mechanically Transferable) ferrule.

Typically, MPO connectors are joined together to connect the optical transmission path of one fiber optic cable to another fiber optic cable or device, and the connection may be made by inserting the MPO connectors in an MPO adapter. An adapter generally includes a housing, or portion of a housing, having at least one port which is configured to receive and hold a connector to facilitate the optical connection of the connector ferrule with the ferrule of another connector or other device. Adapters may be used to facilitate connections contained within a chassis. The term "chassis" as used herein broadly refers to a containment structure for housing electrical components or switching components.

As a result of the reduced size small particles in the air or debris resulting from use of the MPO fiber optic connector can become deposited on the endface of the MT ferrule, and interfere with the light signal with an opposing MT ferrule or the light source from a laser.

Therefore, there remains a need for multi-fiber, fiber optic connectors with proper protection against debris or dust and the use of a dust shutter plate helps achieve this desired outcome. Also a dust shutter plate can create debris when the ferrule endface contacts the shutter plate, so this present invention provides one or more solutions to this problem.

SUMMARY

Prior art dust shutter are caps placed over a proximal end of the MPO fiber optic connector. During use the dust cap may be lost or fall off. There is a need for a dust cap formed as part of the adapter and connector system or adapter assembly that is permanent. Also the dust shutter is actuated normally closed when a first connector is removed from the adapter protecting an opposing second connector endface. When the first connector is removed from the adapter, a user may clean the ferrule endface before reinserting into the adapter. So when the adapter does not have a connector within its port, the shutter closes helping to prevent debris from entering via the open or exposed port.

The first embodiment is an adapter with a first end and a second end. The first end accepts a fiber optic connector. The second end has a dual dust shutter plate with each dust shutter plate on a hinged assembly secured to a wall or side of an adapter housing. A separate spring biases closed each dust shutter plate. Each dust shutter plate is off-set an angle alpha along the longitudinal axis of the adapter. The angle alpha is the substantially the same for the first dust shutter plate and the second dust shutter plate so when each dust shutter plate is biased closed, a leading edge of first shutter plate makes contact with a leading edge of the second dust shutter plate providing a substantial barrier to debris entering the adapter port when the fiber optic connector is not inserted into the port. When the first leading edge contacts the second leading edge depending on the spring force the first dust shutter plate or the second dust shutter plate should bend inward slightly to help form a tight seal along the edges of the dust shutter plates.

In a second embodiment, a single hinged dust shutter plate covers the port and helps protect from debris ingress when the connector is removed from the adapter port. The single plate invention reduces the number of components, and does not rely on the mating at the edges of the two plate system as described in the first embodiment. In this embodiment, the dust shutter plate is made of a material that has a spring constant such as metal from which living hinge is formed thus removing the need for a separate bias spring to keep the dust shutter closed when the connector is not inserted into the adapter port.

BRIEF DESCRIPTION OF THE FIGURES

FIG. 1 depicts perspective view of a prior art MPO connector using a dust cap;

FIG. 2 depicts an exploded view of an MPO connector reconfigured for used with an adapter deploying an in-line dust shutter, FIG. 3 is a cross-section view of an adapter deploying an in-line dust shutter assembly;

FIG. 4A is a perspective view of the dust shutter plate and hinge assembly deployed in the adapter port;

FIG. 4B is an exploded view of FIG. 4A installed as part of adapter,

FIG. 4C is a cross-section view showing only one of dust shutter plate and hinged assembly installed in the adapter.

FIG. 4E is a perspective view of hinged shutter door assembly;

FIG. 5B is a perspective view of control springs installed onto connector.

FIG. 5C is a perspective view of the MPO connector actuating the in-line dust shutter subassembly during insertion of the connector into the adapter port;

FIG. 9B is an isometric view showing the MPO connector within the adapter port and dust shutter plates fully retracted;

FIG. 9C is an isometric view showing the MPO connector being removed from the adapter port and the in-line dust shutter plate assembly.

FIG. 10 is a perspective view of an in-line adapter with a single dust shutter plate according to a second embodiment of the present invention;

FIG. 11 is an exploded view of an in-line adapter with the single dust shutter plate;

DETAILED DESCRIPTION

Figure 4D:
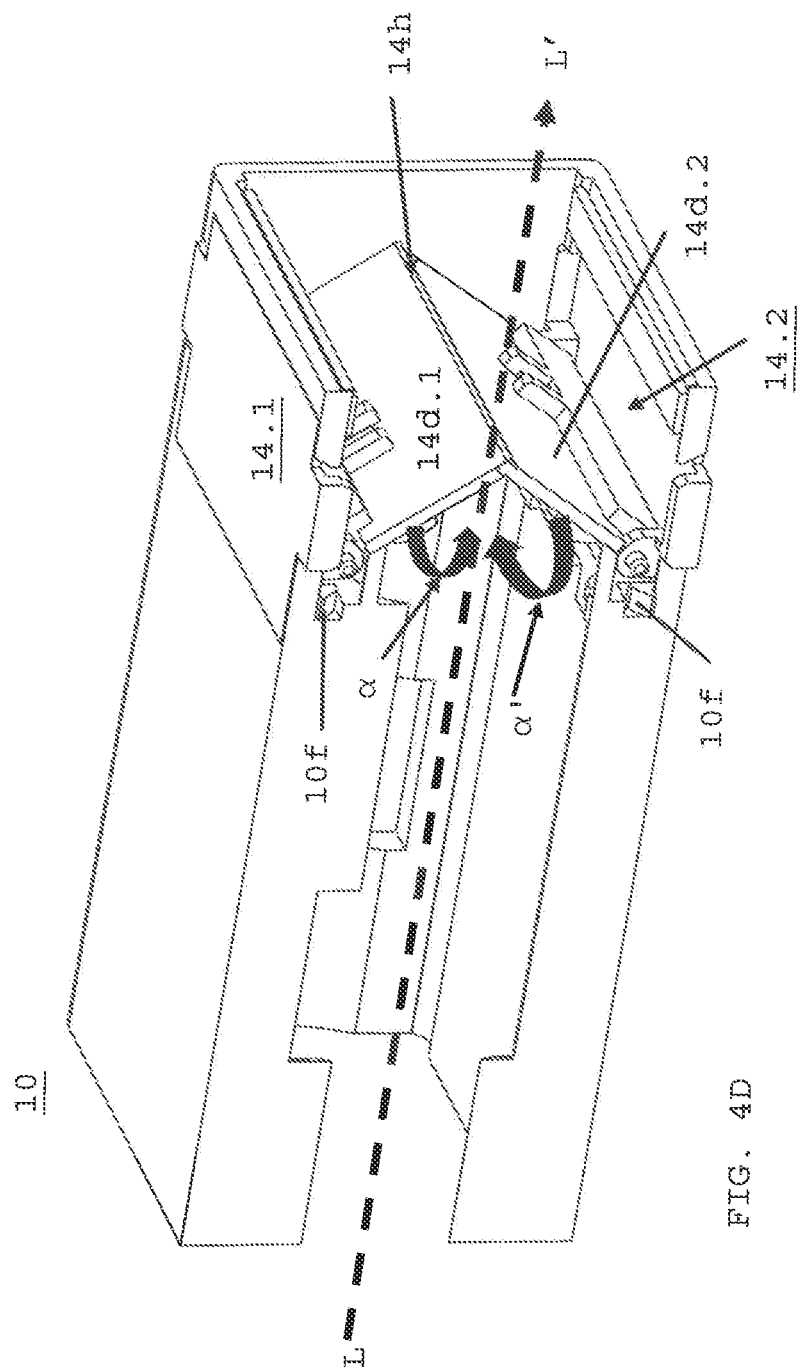
FIG. 4D is an isometric view of in-line dust shutter plate with dual shutter plate and hinged subassembly installed in a closed position.

As used herein, the term "optical fiber" is intended to apply to all types of single mode and multi-mode light waveguides, including one or more bare optical fibers, coated optical fibers, loose-tube optical fibers, tight-buffered optical fibers, ribbonized optical fibers, bend performance optical fibers, bend insensitive optical fibers, nanostructured optical fibers or any other expedient for transmitting light signals. A multi-fiber optic cable includes a plurality of the optical fibers. Such cables have a variety of names depending on their particular usage, and may be considered as "trunk cables" or "trunks" when connected to fiber optic modules used to form connections to jumper cables using a select polarity.

For connection of cables together or with other fiber optic devices, the terminal ends of a cable may include a connector. A connector may include a housing structure configured to interact with and connect with an adapter. An adapter, in a simple form, may include two aligned ports for aligning fiber optic connectors therein to align and connect optical fibers end-to-end. As described herein, the connectors and adapters may be considered multi-fiber connectors and multi-fiber adapters.

While the following description is directed towards MPO adapters and MPO connectors with MT optical ferrules, the embodiments described may be applicable to other adapters, connectors and ferrule types as well. FIG. 1 depicts prior art MPO connector (50) with dust cap (52) separated from a proximal end or mechanical transfer ferrule (54) of the MPO connector. FIG. 2 depicts a modified MPO connector (16) with bias projection (16*f*) manufactured by the Applicant and disclosed in U.S. Pat. No. 10,295,759 to WONG, titled "Optical Connector with Forward-Biasing Projections", granted on May 21, 2019 and the subject matter of this granted patent is fully incorporated by reference into this application. MPO connector (16) is modified as described below in FIG. 5A. FIG. 2 depicts control springs (11*a*, 11*b*) that are secured within adapter housing (10) and with MPO connector (16). The controls springs allow a user to insert or release MPO connector (16) using push/pull collar (18) from an adapter port.

Figure 8:
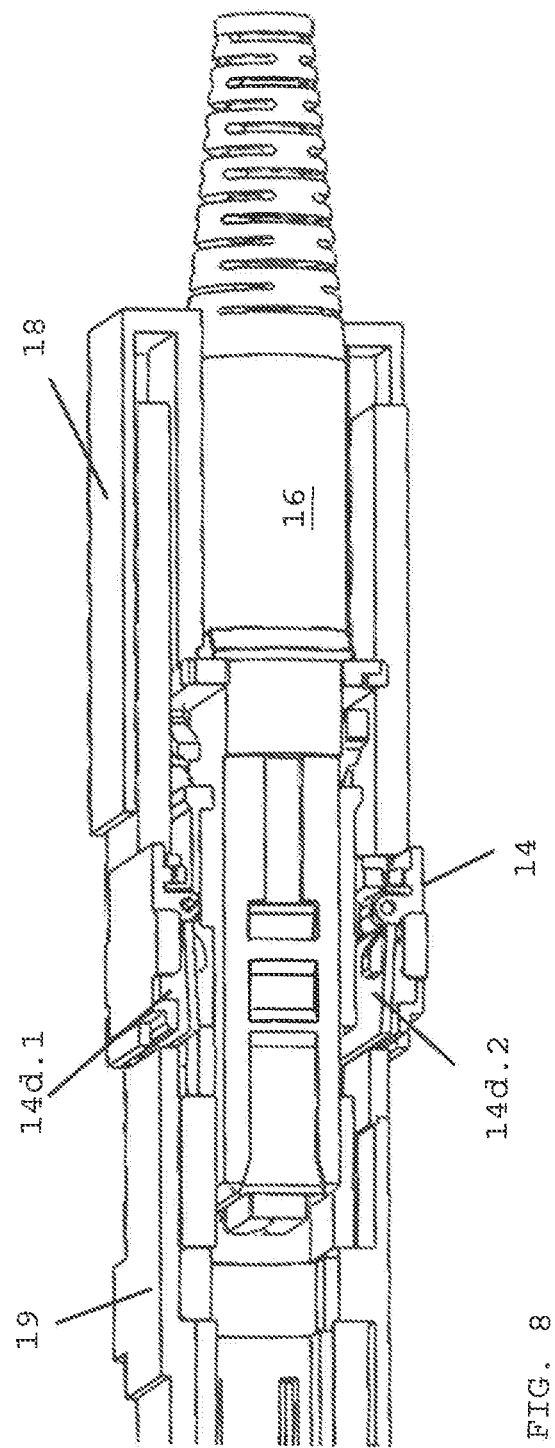
FIG. 8 is a cross-section of MPO connector fully inserted into adapter port with in-line dust shutter subassembly fully retracted.

FIG. 3 depicts adapter (10) with opposing first end (10*c*) and second end (10*d*) along longitudinal axis (L-L'). First end defines a distal end of the adapter/connector system, and the second end defines a proximal end of the adapter/connector system. MPO connector (16) is inserted into the first end of the adapter and opens or displaces the first dust shutter plate and the second dust shutter plate when the MPO connector is fully inserted into the adapter, as depicted in FIG. 8. Hinged dust shutter plate assembly (14) (refer to FIG. 4A), is secured within wall (10*a*) of adapter (10). To form adapter (10), a pair of opposing hinged dust shutter plate assembly (14) are installed such that each dust shutter plate (14*d*) are at an angle alpha (α) from a center line along L-L'. When alpha prime (α') is approximately equal to alpha (α), opposing dust shutter plates met at contact point (14*h*) (at FIG. 4D). The dust shutter plates form a substantial seal at contact point (14*h*). Also at FIG. 9D, first dust shutter plate (14*d*.1) is slightly bent upward at line (14*i*) as shown by arrow "U" due to the spring force of spring (14*b*.1) is more than the spring force of spring (14*b*.2) of the first shutter plate assembly over the second shutter plate assembly. The invention does not depend on different spring forces to seal the contact point between the dust shutter plates, but a difference of about 1-2 Newtons does not depart from the invention. Referring to FIG. 3 adapter housing (10*a*) has opening (10*b*) that accepts latch (16*b*.1) formed on outer housing (16*d*) (refer to FIG. 5A). This secures MPO connector (16) within adapter (10) until the connector is removed by a user pulling on push/pull collar (18) distally (refer to FIG. 9C). Hinged dust shutter plate assembly (14) has plural of snap-latch (14*g*.1, 14*g*.2) that secure an outer wall to the opposing shutter plate assembly forming adapter (10).

FIG. 4A depicts hinged shutter plate assembly (14) with hinged door top plate (14*a*) having ledge (14*e*) at a proximal end, shutter plate (14*d*) offset to top plate (14*a*) by angle (a, a') from longitudinal axis (L-L'). Dust shutter plate (14*d*) is biased by spring (14*b*) about hinged door rotation axis pin (14*c*). Connector side of dust shutter plate (14*d*) has protrusion (14*f*) (refer to FIG. 4*c*). Leading edge (14*j*.1) of first dust shutter plate (14*d*.1) and leading edge (14*j*.2) of second dust shutter plate (14*d*.2) form contact point (14*h*) (also refer to FIG. 4D). As discussed below, the protrusion contacts the outer housing of the MPO connector during connector insertion into the adapter first end. This prevents endface (16*c*) of MPO connector (16) from contacting the shutter plate. The non-contract prevents damage to the optical fibers or their coating at the endface of the ferrule. As is known in the prior art, a mechanical ferrule has a plural of optical fibers formed as part of a ferrule body. The ends of the optical fibers are polished and can be coated with an anti-reflective material to reduce transmission loss.

FIG. 4B depicts hinged shutter door assembly (14) prior to securing to adapter wall (10*a*) along line "A". Adapter (10) opening (10*g*) accepts shutter door assembly (14). Adapter spring retention sites (10*e*) are for control springs (11*a*, 11*b*) (refer to FIG. 5B). The control springs allow the user to pull the push/pull collar in a distal direction to release the MPO connector from adapter (10), and the control springs return collar (18) to a relaxed or original positions as depicted in FIG. 9B. Hinged door stop (10f) helps retain the dust shutter plate under the bias of spring (14b) at the correct angle relative to longitudinal axis (L-L') of the adapter. FIG. 4C depicts cut-away view of hinged dust shutter plate assembly (14) secured to adapter (10). The dust shutter plate has a protrusion (14f) on the connector-facing side of the plate, the plate is stopped or positioned at angle alpha by hinged door stop (10f) formed as part of the adapter housing. Hinged dust shutter plate assembly (14) is secured within opening (10g) when ledge (14e) is positioned beneath adapter wall (10a) and the opposing end of top plate (14a) is secured within a slot formed between hinged door stop (10f) and outer wall (10a) of adapter (refer to FIG. 4B). Opening (10b) accepts retention latch (16b.1) that secures connector (16) with adapter at the first end, and when the user pulls distally on collar (18) the connector retention latches (16b.1, 16b.2) are displaced from the adapter opening (10b) and the connector is removed from the first end.

FIG. 4D depicts cut-away view of opposing hinged dust shutter plate assembly (14.1, 14.2) secured as part of adapter (10), and shutter plates (14d.1, 14d.2) are closed under a spring force of bias spring (10b.1, 10b.2) (refer to FIG. 4A). When the shutter plates are closed, the leading edge of each shutter plate meets at contact point (14h) to form substantial barrier or seal against debris ingress along longitudinal line (L-L') of adapter (10). Dust shutter plates (14d.1, 14d.2) are at angle alpha (α) and angle alpha prime (α') from a normal formed from rotational axis ("RA") (refer to FIG. 4A) and longitudinal line (L-L'). The angles are within a few degrees of each other and each angle is about 30-45 degrees. The angled is determined by the connector housing and protrusion (14f) size. Protrusion (14f) is positioned on the connector-facing side of the dust shutter plate, and the protrusion strikes housing contact surface (16h) of the fiber optic connector (as similar shown in FIG. 7) rather than ferrule endface (16c). By reducing and, if possible, eliminating contact between the dust shutter plate and the ferrule endface, the optical fibers within the ferrule and terminated at the ferrule endface by polishing and a refractive coating, are not damaged when the metal dust shutter plate impacts the optical fibers each time the connector is inserted into the adapter. This reduces insertion loss between opposing ferrules endfaces positioned with the adapter.

FIG. 4E is a perspective view of hinged shutter plate assembly (14) in a closed position. Dust shutter plate (14d) is hinged (14k) about pin (14c) along rotational axis ("RA"), Bias spring (14b) is secured about pin (14c) and places the shutter plate in a normally closed position as depicted in FIG. 4D. One or more protrusion (14f) is positioned on the dust shutter surface on the connector-facing side of the dust shutter. So when the connector is inserted into the first end of the adapter, the connector housing contacts the metal dust shutter plate not the endface of the connector that holds the optical fiber carrying the light or data signal.

Figure 5A:
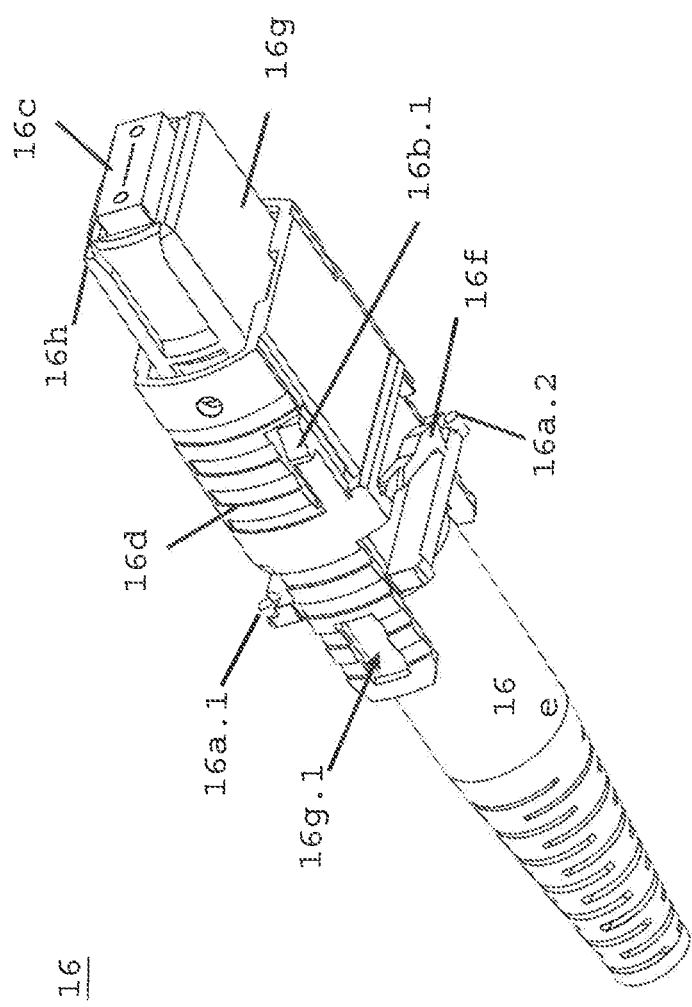
FIG. 5A is a perspective view of an MPO connector configured to operate the in-line dust shutter of FIG. 4D.
Figure 6B:
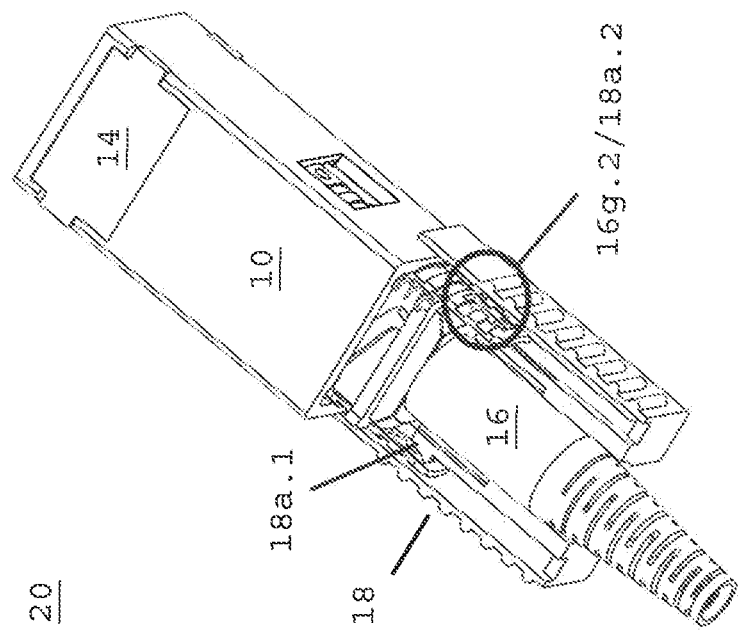
FIG. 6B discloses the MPO connector secured within the adapter port.
Figure 6A:
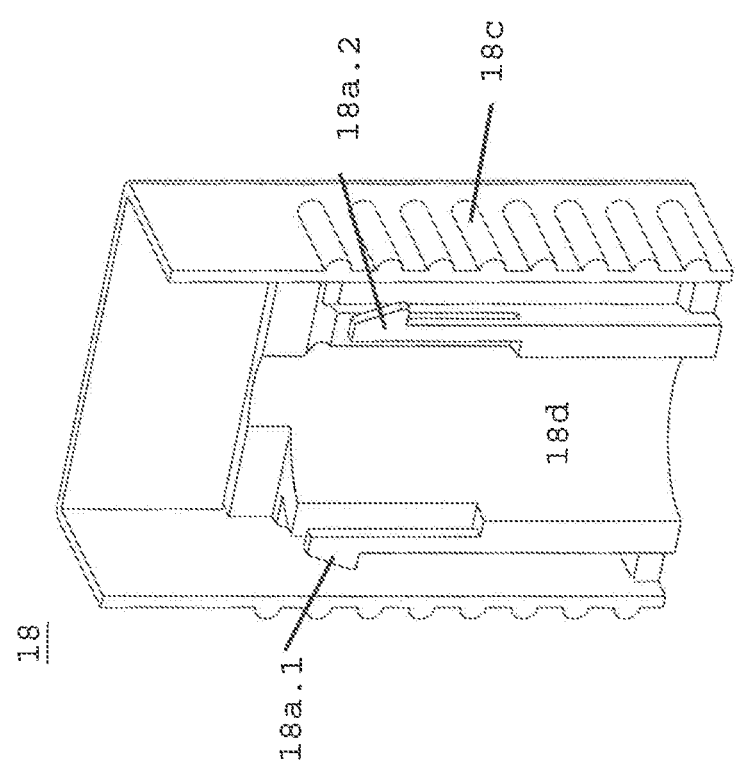
FIG. 6A is a cross-section of push/pull collar showing inner latches to secure the MPO connector within the adapter port.

FIG. 5A depicts a typical fiber optic connector. FIG. 5A specifically discloses a MPO fiber optic connector modified to accept collar (18) to remove the connector from the adapter, and retention latch (16b.1, 16b.2 (opposing side)) to secure the connector within the adapter unless the user applies a pull force on the collar to overcome the retention latch pull strength. Bias wing (16f) returns outer housing (16d) over inner housing (16g) after the connector is removed from the adapter. Push/pull collar opening accepts and secures collar (18) via opposing collar snap-hook (18a.1, 18a.2) (refer to FIG. 6A) in openings (16g.1, 16g.2) (refer to FIG. 6B) respectively. Contact surface (16h) strikes protrusion (14f) on the dust shutter plate instead of ferrule endface (16c), as described above. To return collar (18) to normal position covering the fiber optic connector housing (FIG. 6B), control spring retention pin (16a.1) is formed as part of outer housing (16d), which holds one end of a control spring. Collar (18) covers most of connector (16) with a portion of cable boot (16e) exposed (also refer to FIG. 6B). FIG. 5B depicts a perspective view of control springs (11a, 11b) secured to the control retention pin sites. FIG. 5C depicts a second end of the control springs (11b) secured to adapter spring retention sites (10e), and retention latch (16b.1) securing connector (16) within adapter (10). FIG. 6A depicts collar (18). The collar has gripping features (18c) for the user pulling on the collar to remove the connector from the adapter. Inner housing (18d) is formed to accept a portion of cable boot (16e). Operation of collar (18) and control springs (11a, 11b) allows a user to remove the connector from the adapter when pulling on the collar (18) distally and, control springs return the collar to its normal position when the user removes the connector from the adapter.

Figure 7:
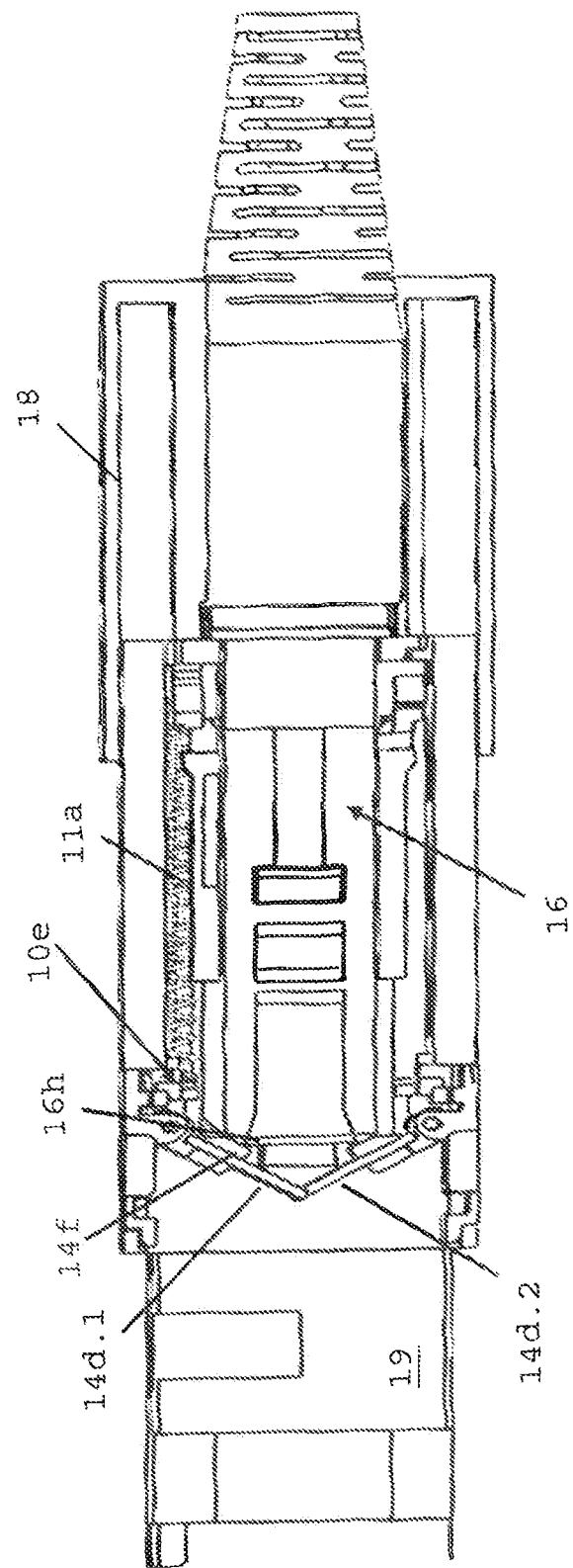
FIG. 7 is a cross-section of MPO connector contacting in-line dust shutter plates.
Figure 9A:
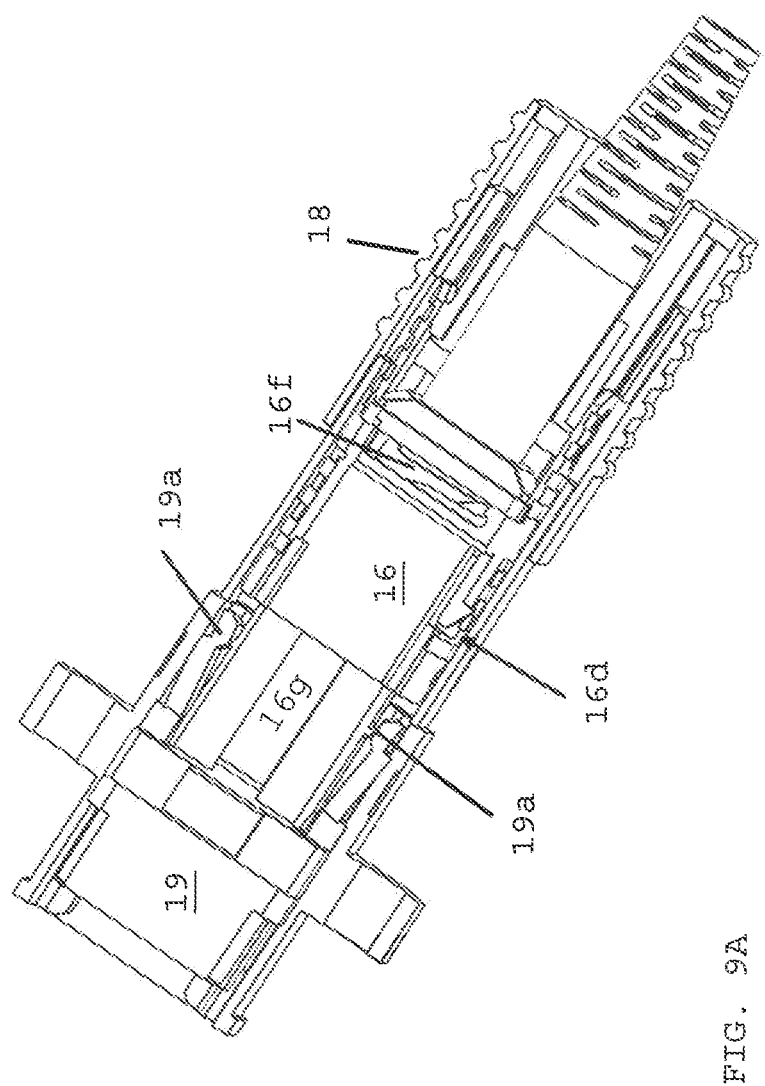
FIG. 9A is a top cross-section view of FIG. 8 depicting MPO connector secured by adapter inner latches.

FIG. 7 depicts inserting connector (16) into adapter (19) and contact surface (16h) strikes protrusion (10f) forcing open opposing dust shutter plate (14d.1, 14d.2). Collar (18) is in a normal position without control spring (11a) compressed. FIG. 8 depicts connector (16) fully inserted into adapter (19) with dust shutter plate (14d.1, 14d.2) fully retracted or closed. FIG. 9A depicts cut-away of connector (16) inserted into adapter (19). Adapter latches (19a) are secured with a cut-out on opposing sides of inner housing (16g), which is known in the prior art as how to secure the MPO connector within the adapter. FIG. 9B depicts a cut-away of connector (16) fully inserted, in direction of "I", into adapter with opposing dust shutter plate (14d) open or retracted. FIG. 9C depicts removing the connector by pulling distally in direction "R" collar (18). Dust shutter plate (14d.1, 14d.2) will rotate in direction of arrow "C" under the spring force stored in bias spring (14b.1, 14b2). As collar (18) is pulled distally, collar snap-hook (18a) secured within opening (16g) pulls back outer housing (16b) displacing latch (16b.1) from adapter.

Figure 9D:
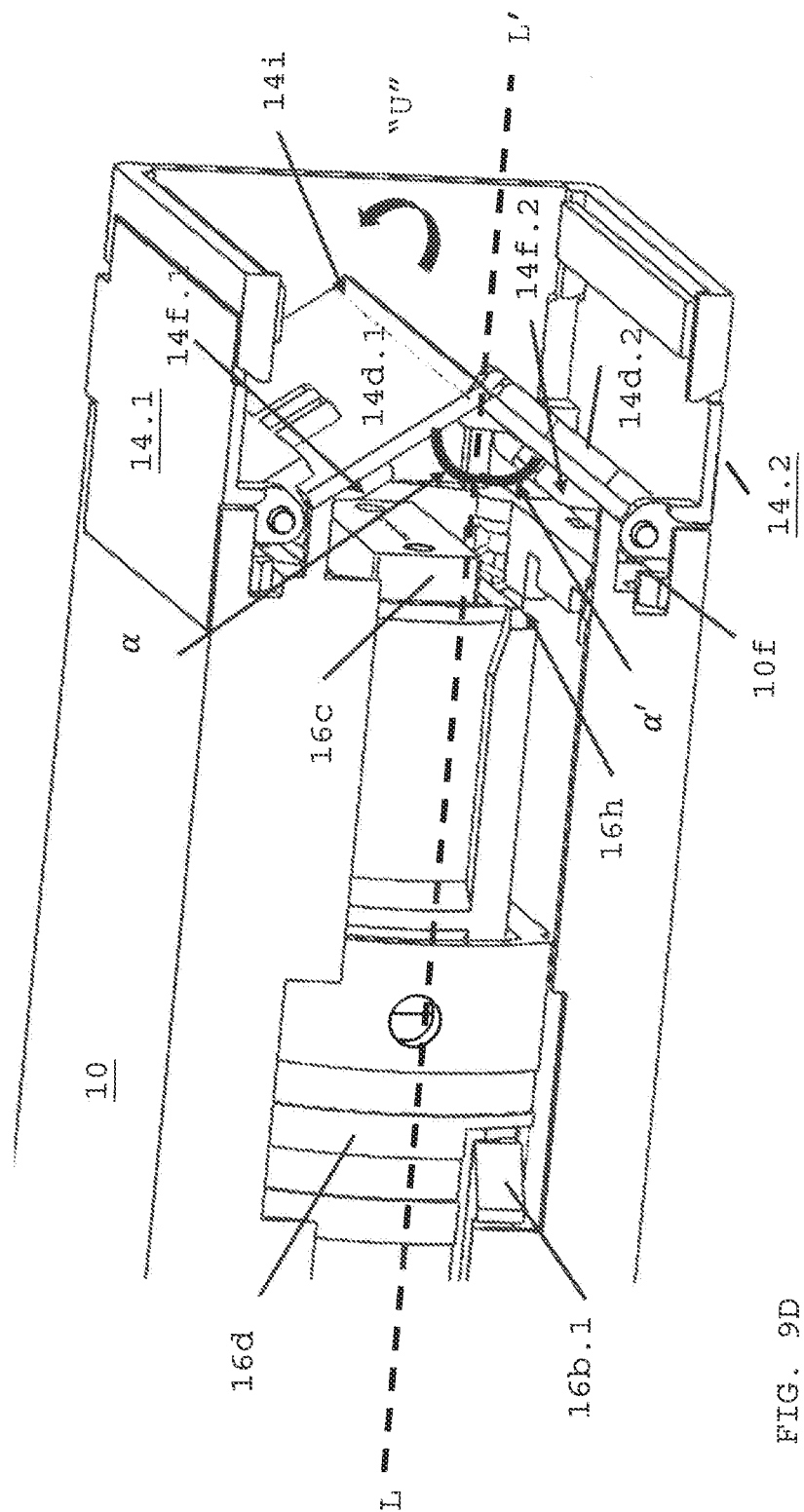
FIG. 9D is an isometric view showing the MPO connector just prior to contacting the in-line dust shutter plates.

FIG. 9D depicts a zoomed view of cut-away of the connector being inserted into adapter (10) just prior to protrusion (14f.1, 14f.2) striking contact surface (16h) on inner housing of the connector. Dust shutter plate (14d.1, 14d.2) are in contract along fold line (14i) where the spring constant in the bias spring for shutter (14d.2) is slightly stronger than the spring constant in the bias spring for shutter (14d.1) resulting in dust shutter plate (14d.1) being bent slight upwards along its leading edge by opposing leading edge of dust shutter plate (14d.2). The angle alpha prime (α') is less than forty-five (45) degrees and the angle alpha (α) is greater than forty-five degrees (45) due to the differing spring constants or force exerted by respective bias springs (14b.1, 14b.2) part of opposing dust shutter plate assembly (14.1, 14.2).

FIG. 10 depicts a second embodiment of in-line dust shutter adapter deploying a hinged dust shutter plate assembly. Adapter (60) uses only one dust shutter plate (40d) (refer to FIG. 15). Channel (30a) with retention slot (30b) secures connector (16) (FIG. 11) within adapter-connector system (60) via retention latch (16b.1, 16b.2) (refer to FIG. 12). Boot (16i) receives and secures a fiber optic cable with at least one optic fiber therein. FIG. 11 depicts an exploded view of FIG. 10 with a plural of control spring (11a-11d) used to remove connector (16) from adapter housing (30).

Figure 12:
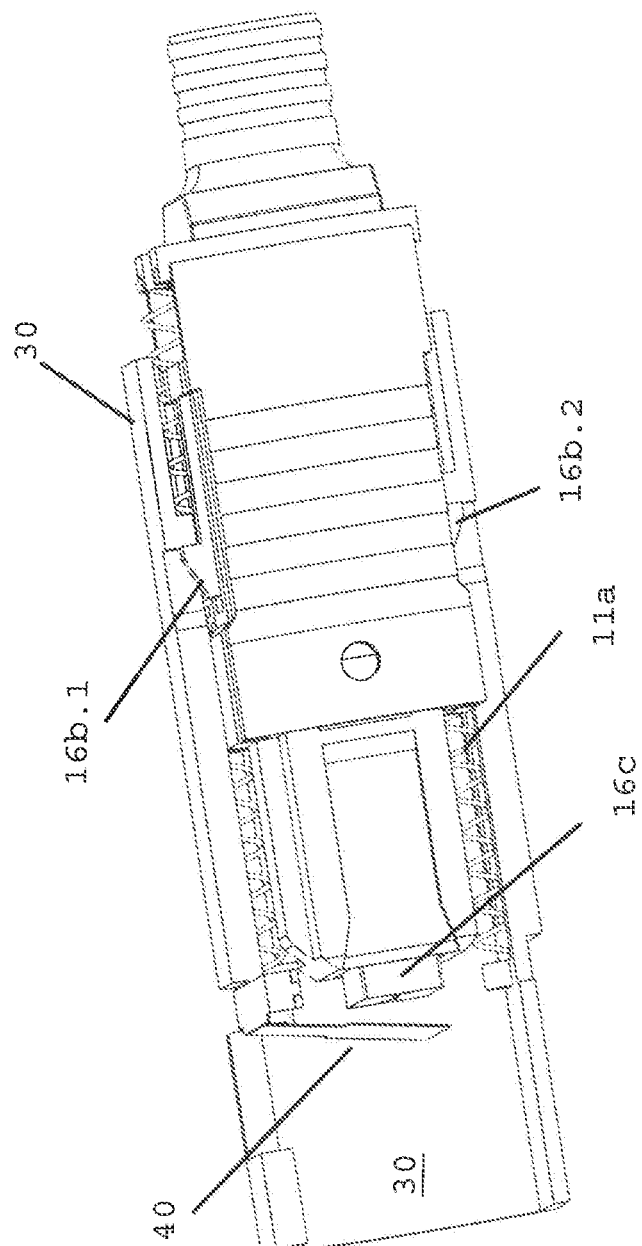
FIG. 12 is a cross-section view of an MPO connector prior to contacting the single dust shutter plate of FIG. 11.
Figure 13:
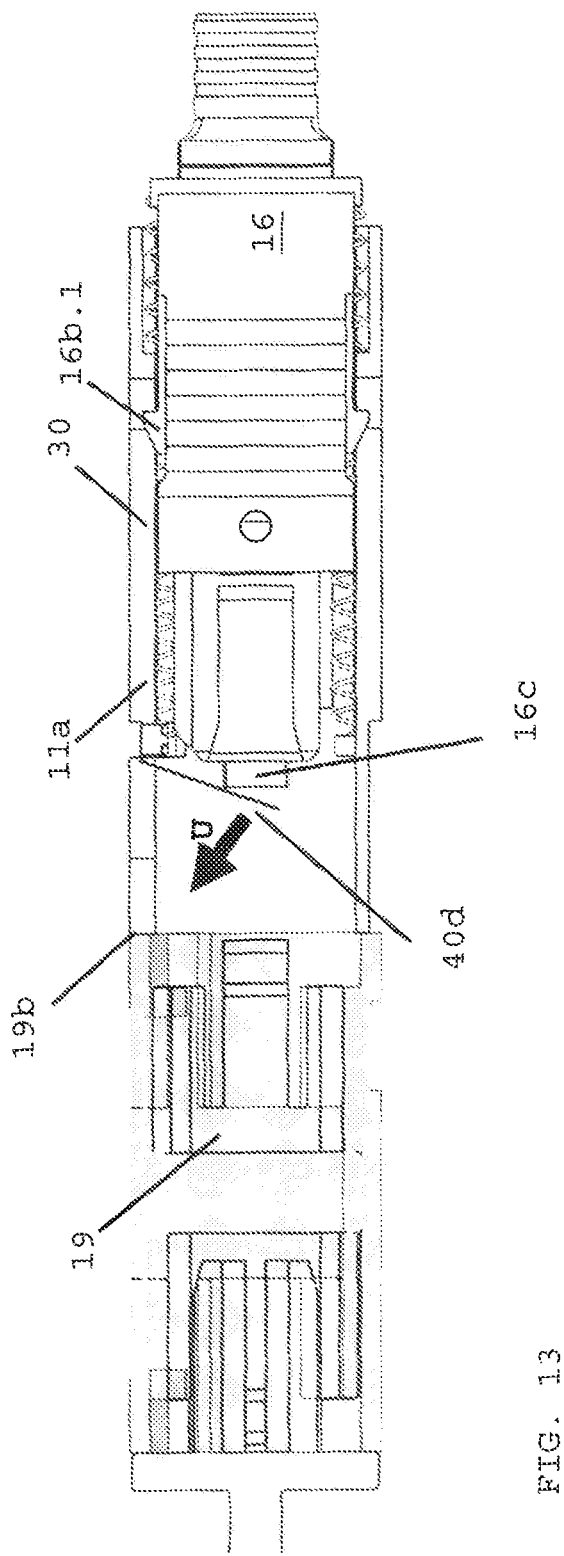
FIG. 13 is a cross-section view of the MPO connector contacting the dust shutter plate and prior to full insertion of the connector within an adapter.
Figure 14:
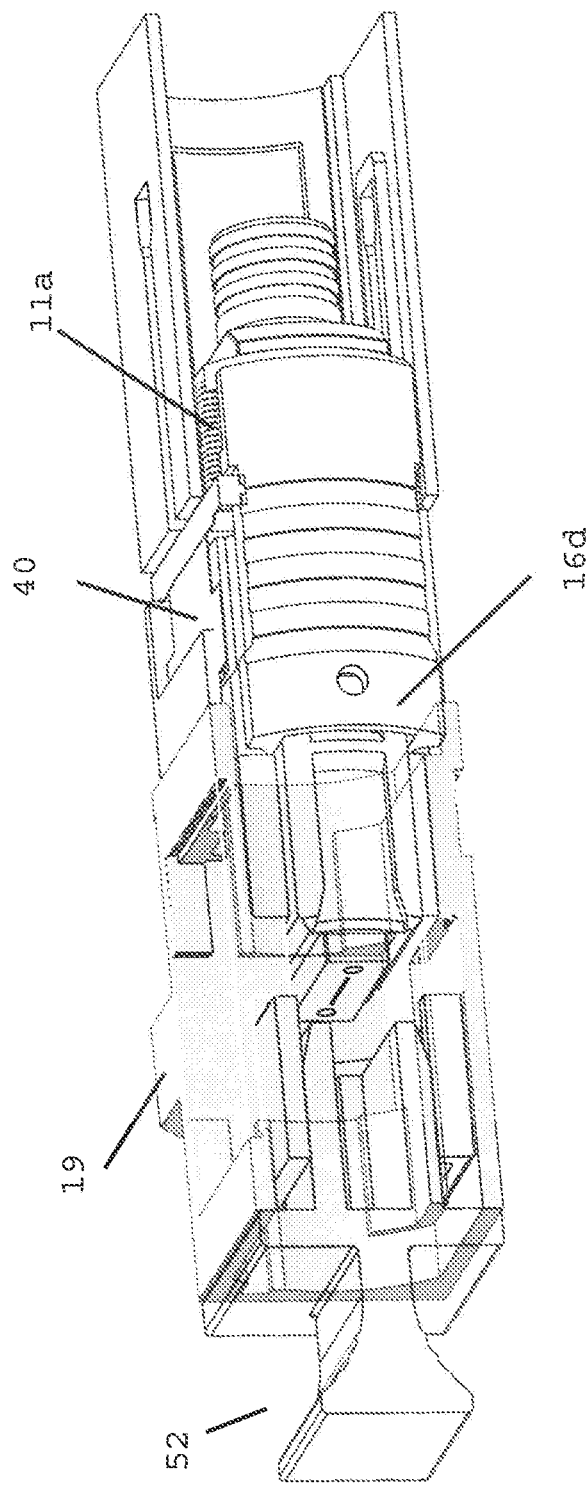
FIG. 14 is a cross-section view of the MPO connector fully inserted into the adapter with the single dust shutter plate fully retracted.
Figure 15:
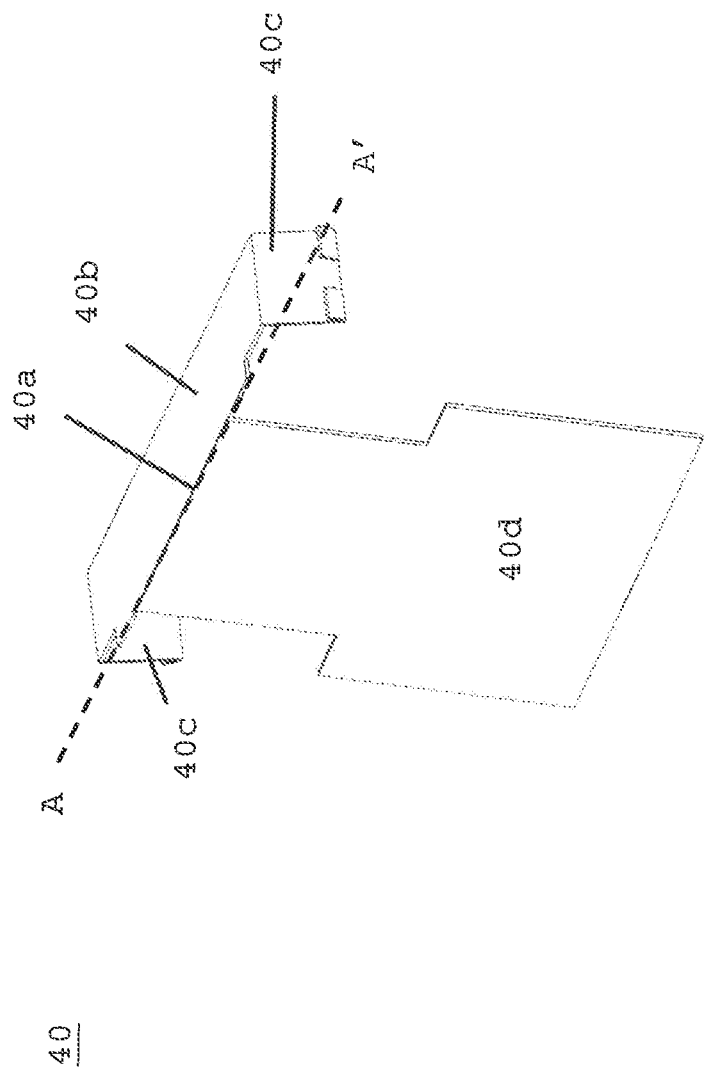
FIG. 15 is a perspective view of the single dust shutter plate assembly.
Figure 16:
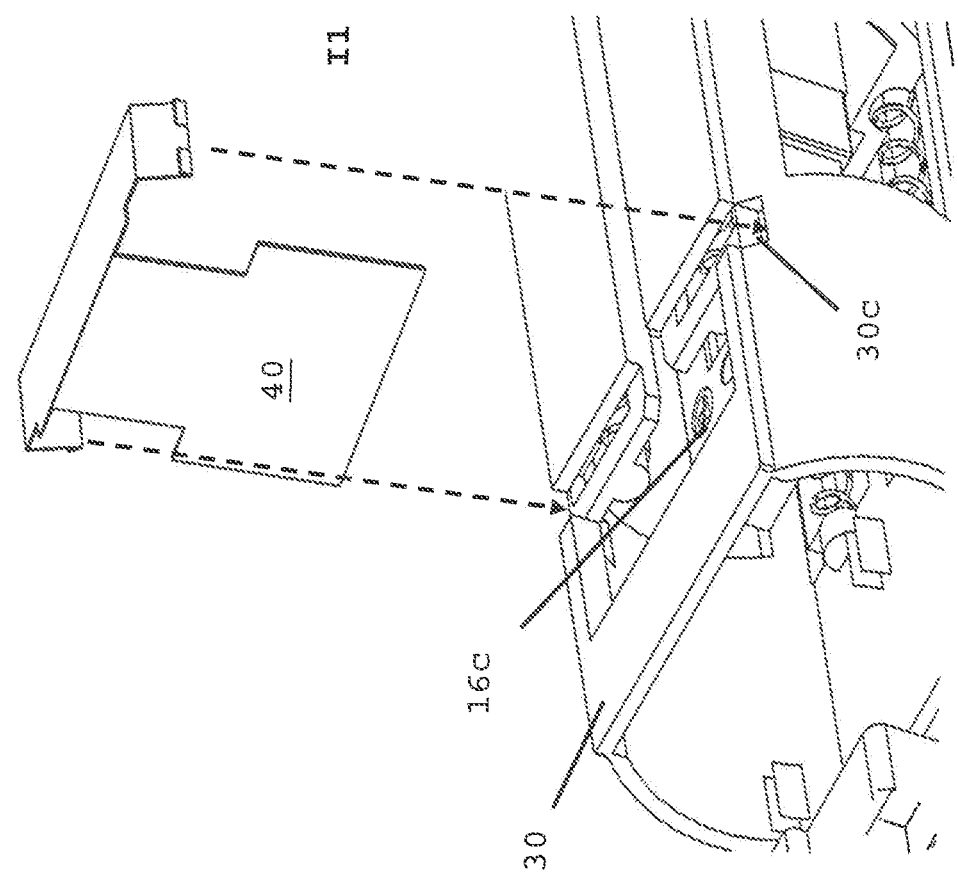
FIG. 16 is an exploded view of inserting the single dust shutter plate assembly into the adapter of FIG. 10.

FIG. 12 is a cut-away side view of FIG. 10 depicting connector (16) just prior to contacting dust shutter plate (40d) when ferrule endface (16c) strikes the connector-facing side of the dust shutter plate. FIG. 13 depicts further inserting of connector (16) within adapter (19), and ferrule endface (16c) strikes dust shutter plate (40d) and displaces the plate in direction of arrow "U". FIG. 14 depicts dust shutter plate (40d) fully displaced and position within a cut-out formed within adapter inner wall. A dust cap (52) is inserted over the second end of adapter. FIG. 15 depicts a perspective view of hinged dust shutter plate assembly (40) with living hinge (40a) formed by bending the metal plate along line A-A'. Dust shutter plate (40d) is bent approximately ninety (90) degrees to bridge (40b). At opposite ends of bridge (40b) is elastic clip with pinchers (40c). FIG. 16C depicts installing hinged dust shutter plate assembly (40) into adapter (30) with elastic clip (40c) being secured within cut-out (30c).

Various parts, components or configurations described with respect to any one embodiment above may also be adapted to any others of the embodiments provided.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Various of the above-disclosed and other features and functions, or alternatives thereof may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. An adapter for receiving a fiber optic connector, comprising:
    an outer housing with a first end and a second end,
    the first end receives a fiber optic connector,
    the second end has opposing hinged dust shutter assemblies;
    each hinged dust shutter assembly comprising:
    a dust shutter plate hinged to a top plate and biased closed by a bias spring;
    the dust shutter plate is offset by an angle alpha from a longitudinal axis L-L' of the adapter, and wherein the angle alpha is configured so a protrusion formed on a connector-facing side of the dust shutter plate contacts an outer housing of the fiber optic connector during insertion of the fiber optic connector thereby reducing contact of the dust shutter plate with an optical fiber of a ferrule at an end of the fiber optic connector.

2. The adapter according to claim 1, wherein a spring force of the first dust shutter plate assembly differs from a spring force of the second dust shutter plate assembly resulting in the first dust shutter plate or the second dust shutter plate slightly deforming at a contact point between a leading edge of each dust shutter plate.

3. The adapter according to claim 1, wherein a plurality of control springs are each secured on a coil spring holding site positioned on an outer housing of the connector at a first end of the control spring and on an adapter coil spring holding site at a second end of the control spring, and a push-pull collar is secured to the outer housing of the fiber optic connector thereby allowing the fiber optic connector to be removed from the adapter port using the push-pull collar.

4. The adapter according to claim 1, wherein the adapter outer housing has opposing openings configured to accept a retention latch on the fiber optic connector to secure the fiber optic connector within the first end of the adapter.

5. The adapter according to claim 4, wherein the retention latch formed on an outer housing of the fiber optic connector secures the fiber optic connector from an inadvertent fiber optic connector release unless a sufficient force is applied to a push/pull collar on the fiber optic connector to overcome the retention latch.

6. The adapter according to claim 3, wherein the push-pull collar has a pair of opposing collar snap hooks that are received in a corresponding fiber optic connector push-pull collar mount opening so when the push-pull collar is pulled in a distal direction the fiber optic connector is released from the first end of the adapter.

7. The adapter according to claim 1, wherein the first angle alpha differs from the second angle alpha prime allows the second dust plate to be received beneath the first dust shutter plate whereby the seal is formed as a right angle between the first dust shutter plate and the second dust shutter plate.

8. The adapter according to claim 1, wherein the hinged dust shutter plate assembly further comprises a hinged door rotational axis pin that receives the bias spring.

9. The adapter according to claim 1, wherein the hinged dust shutter plate assembly further comprises a top plate with a ledge and a plurality of snap-latches that secures the hinged dust shutter assembly to a side wall of the adapter housing.

10. The adapter according to claim 1, wherein the hinged dust shutter plate assembly is a single dust shutter plate that substantially seals a second end of the adapter when the fiber optic connector is removed from the first end of the adapter.

11. A hinged dust shutter plate assembly, comprising:
    a hinged dust shutter plate rotates about a pin forming a rotational axis;
    a bias spring is placed about the pin and the spring biases the hinged dust shutter plate closed when a fiber optic connector is removed from a first end of an adapter;
    the hinged dust shutter plate is offset at an angle alpha from the rotational axis;
    a top plate with a ledge and a plurality of snap that latches secure the hinged dust shutter assembly as part of the adapter housing,
    the top plate has a protrusion on a connector facing side of the dust shutter plate; and
    wherein the protrusion contacts a housing of a fiber optic connector inserted into a first end of the adapter housing thereby preventing a ferrule endface of the fiber optic connector from contacting the dust shutter plate and damaging polished optical fibers or a coating applied to the optical fibers formed as part of the ferrule endface.

* * * * *